(12) United States Patent
Holme et al.

(10) Patent No.: US 6,474,171 B1
(45) Date of Patent: Nov. 5, 2002

(54) VACUUM GAUGE

(75) Inventors: Alan Edward Holme, Polegate; Waleed Ahmed Qader, Eastbourne, both of (GB)

(73) Assignee: The BOC Group plc, Windlesham (GB)

( * ) Notice: Subject to any disclaimer, the term of this patent is extended or adjusted under 35 U.S.C. 154(b) by 0 days.

(21) Appl. No.: 09/528,980

(22) Filed: Mar. 21, 2000

(30) Foreign Application Priority Data

Mar. 24, 1999 (GB) .............................................. 9906788

(51) Int. Cl.[7] .............................. G01L 9/00; G01L 21/12
(52) U.S. Cl. ............................................. 73/753; 73/755
(58) Field of Search ........................ 73/753, 756, 724, 73/718, 722, 728, 755; 378/35; 313/336, 309, 310, 351

(56) References Cited

U.S. PATENT DOCUMENTS

| 4,847,564 A | | 7/1989 | Limp |
| 5,146,481 A | * | 9/1992 | Garg et al. .................... 378/35 |

FOREIGN PATENT DOCUMENTS

| DE | 30 47 744 | 7/1982 |
| GB | 2 256 310 | 12/1992 |

* cited by examiner

*Primary Examiner*—William Oen
(74) *Attorney, Agent, or Firm*—Joshua L. Cohen; Salvatore P. Pace

(57) ABSTRACT

A vacuum gauge of the cold cathode type has a gauge head which includes a cathode discharge cell and an anode a portion of which is located within the cathode discharge cell. An electrically operated ignition device is located adjacent the cathode discharge cell which ignition device is protected from being operated at high pressure by an auxiliary pressure sensor.

8 Claims, 1 Drawing Sheet

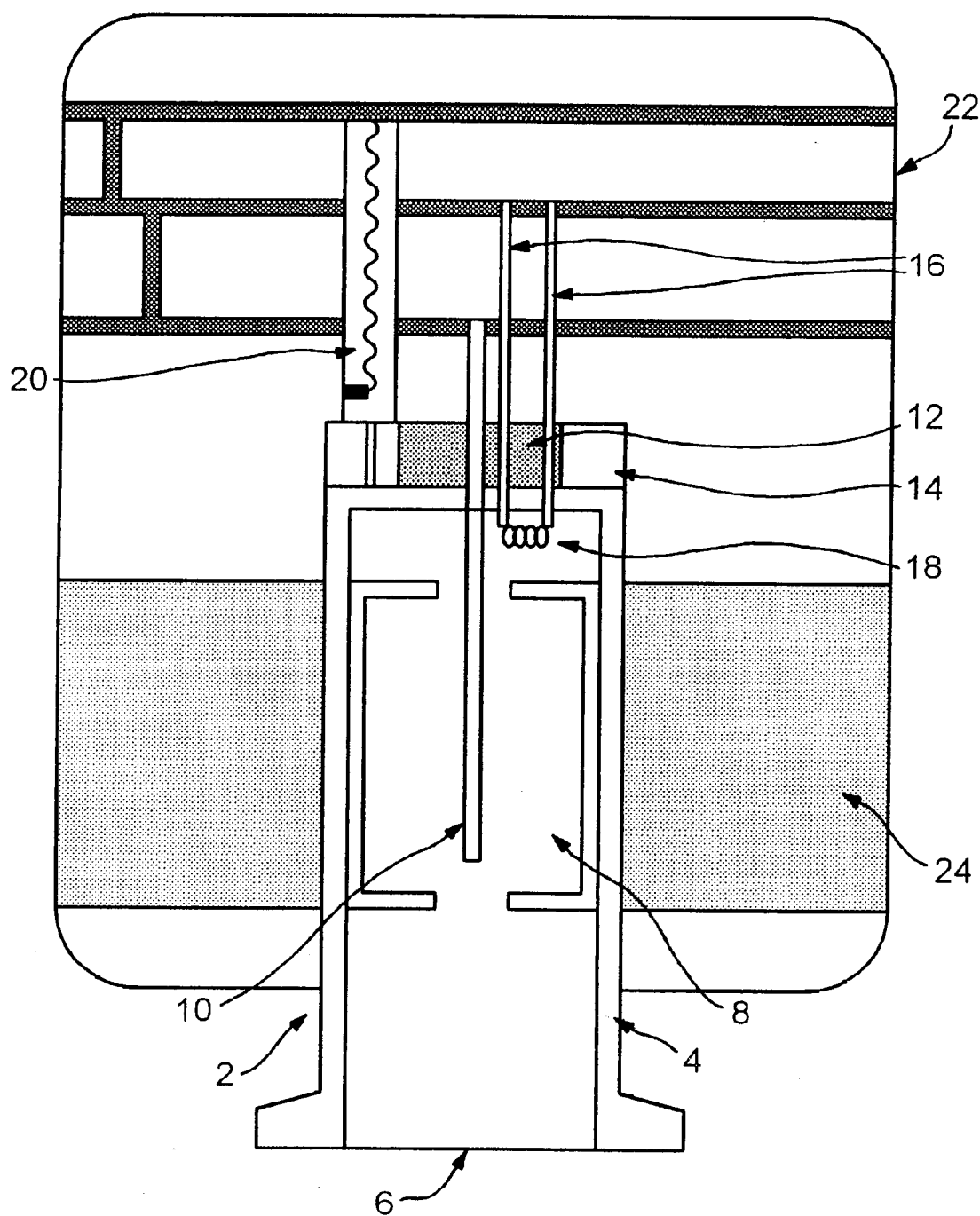

VACUUM GAUGE

BACKGROUND OF THE INVENTION

The present invention relates to vacuum gauges and, more particularly, to cold cathode ionisation vacuum gauges.

Cold cathode ionisation gauges for measuring vacuum, sometimes referred to as "Penning" gauges are well known in the vacuum art. They usually comprise an anode and one or more cathodes. In use, a large potential difference is applied between the anode and the cathode or cathodes and a substantial magnetic field is applied by a permanent magnet in the area between the electrodes. The anode and the cathode or cathodes are held in a predetermined configuration relative to each other by means of a vacuum feedthrough which isolates the electrodes within the gauge from the atmosphere outside.

In use, when the gauge is subjected to the vacuum to be measured a discharge will be formed between each cathode and the anode in which electrons are accelerated towards the anode by the electric field. However, the action of the magnetic field applied by the permanent magnet causes the electrons to adopt a very long, non-linear trajectory, for example, a helical trajectory, before striking the anode. As such, the probability of ionisation of gas molecules present in the vacuum by collision with the electrons is much higher even at low pressures. Electrons formed by the collisions are attracted by the anode to produce a current in an external circuit, the size of which is related to the molecular weight and density of the gas at a given temperature and therefore to the level of vacuum.

In gauges of the inverted magnetron type, the cathode commonly has associated with it means to define a region or cell within it in which the discharge is confined and the electron current to the external circuit is generated.

However, in such gauges problems are sometimes encountered in the initiation of the discharge (strike or start-up) of the gauge at very low pressures, for example less than $1 \times 10^{-7}$ mbar. In particular, the gauge may take several minutes or even hours to strike because of the low probability of an ionising event occurring.

In GB Patent Publication No. 2256310 a vacuum gauge of the ionisation type includes a gauge head having an outer cathode sleeve with an inlet at one end for communication with a vacuum and a pair of cathode discs positioned substantially radially within the cathode sleeve and defining between them an ion collection region or cell. The discs both have a central aperture and an anode is positioned within the cathode sleeve and within the central apertures of the discs. The strike time of this known vacuum gauge is improved by the provision on the surface of at least one of the apertures formed on the cathode discs of a sharp point or edge which is presented towards the anode.

It is an aim of the present invention to provide a vacuum gauge of the cold cathode type having an electrically operated ignition device positioned in the vicinity of the discharge cell to improve the strike time by providing a source of electrons, the ignition device being protected and controlled using an auxiliary pressure measuring device.

SUMMARY OF THE INVENTION

According to the present invention, a vacuum gauge of the cold cathode type has a gauge head comprising an outer cathode sleeve having an inlet at one end for communication with a vacuum to be measured, a cathode discharge cell located within the sleeve, an anode, a portion at least of which is located within the cathode discharge cell and in which an electrically operated ignition device is located adjacent the cathode discharge cell which device is protected from being operated at high pressure by an auxiliary pressure sensor. The ignition device may be an electrically heated filament or a field-emitting electrode.

Likewise, the auxiliary pressure sensor or pressure measuring device may be a thermal conductivity sensor, a gas friction sensor or a diaphragm sensor. When the ignition device is an electrically heated filament said filament itself may be used as the auxiliary pressure sensor.

In a preferred embodiment the auxiliary pressure sensor is integral within the gauge head.

An embodiment of the invention will now be described, by way of example, reference being made to the accompanying figure described below.

BRIEF DESCRIPTION OF THE DRAWINGS

The FIGURE is a cross-section through a gauge head forming part of a vacuum gauge according to the present invention.

DETAILED DESCRIPTION OF THE INVENTION

As shown in the FIGURE, a gauge head 2 forming part of a vacuum gauge of the cold cathode type comprises a substantially cylindrical cathode sleeve 4 having an inlet 6 at a lower end for communication with a vacuum to be measured. Within the cathode sleeve 4 and in electrical contact therewith is cathode discharge cell 8. Also positioned centrally within the cathode sleeve 4 and extending into the interior of the cathode discharge cell 8 is an anode 10 in the form of a solid rod made, for example, of stainless steel. The anode 10 is held in position by means of a fused glass compression seal 12 placed within the aperture of a ring 14 which arrangement effects electrical insulation between the cathode sleeve 4 and the anode 10.

In this embodiment an electrically operated ignition device is in the form of an electrically heated striker filament 18.

Two rods 16 extend through the glass compression seal 12 and extending between their lower ends is the striker filament 18. As shown the striker filament 18 is located adjacent the cathode discharge cell 8. Arranged above the ring 14 is a thermal conductivity sensor 20 which is used as an auxiliary pressure sensor.

The gauge head 2 is, as shown, mounted in a housing 22 and is surrounded by a magnet 24.

In use, an electrical current is passed through the striker filament 18 heating it to a sufficiently high temperature so that electrons are liberated by thermionic emission. These electrons will initiate a continuous discharge in the cathode discharge cell 8.

The thermal conductivity sensor 20 is provided to give a warning to prevent the striker filament 18 being used at high temperatures when the ambient pressure is high since this will damage the filament 18 due to rapid oxidation.

Alternatively, the striker filament 18 itself can be operated as a thermal conductivity sensor to establish whether the pressure is low enough for its temperature to be raised high enough for electron emission without burning it out.

The ignition device could be a field emitting electrode and the auxiliary pressure sensor could be in the form of a gas friction sensor or a diaphragm sensor.

In a preferred embodiment the auxiliary pressure sensor is integral within the gauge head 2.

While an embodiment of the present invention has been described in some detail, it should be apparent that further modifications and adaptations of the invention will occur to those skilled in the art. It is to be expressly understood, however, that such modifications and adaptations are within the spirit and scope of the invention.

We claim:

1. A vacuum gauge having a gauge head comprising:
    a cathode sleeve having an inlet at one end for communication with a vacuum to be measured;
    a cathode discharge cell located within the cathode sleeve;
    an anode, a portion at least of which is located within the cathode discharge cell;
    an electrically operated ignition device located adjacent the cathode discharge cell; and
    a sensor disposed at the gauge head to generate a signal of a pressure associated with the electrically operated ignition device.

2. The vacuum gauge of claim 1 wherein the electrically operated ignition device is an electrically heated filament.

3. The vacuum gauge of claim 1 wherein the electrically operated ignition device is a field-emitting electrode.

4. The vacuum gauge of claim 1 wherein the sensor is a thermal conductivity sensor.

5. The vacuum gauge of claim 1 wherein the sensor is a gas friction sensor.

6. The vacuum gauge of claim 1 wherein the sensor is a diaphragm sensor.

7. The vacuum gauge of claim 1 wherein the sensor is integral to the gauge head.

8. A vacuum gauge having a gauge head comprising:
    a cathode sleeve having an inlet at one end for communication with a vacuum to be measured;
    a cathode discharge cell located within the cathode sleeve;
    an anode, a portion of which is located within the cathode discharge cell; and
    an electrically heated filament located adjacent the cathode discharge cell, the electrically heated filament being operable as an ignition device for liberating electrons and as a sensor responsive to thermal conductivity at the gauge head to generate a signal of a pressure associated with the electrically heated filament to protect the filament from being operated at high pressure.

* * * * *